United States Patent
Georgin (10) Patent No.: US 9,919,795 B2
(45) Date of Patent: Mar. 20, 2018

(54) ADAPTIVE PRESSURE SKID CONTROL (71) Applicant: GOODRICH CORPORATION, Charlotte, NC (US)

(72) Inventor: Marc Georgin, Dayton, OH (US)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 15/075,601

(22) Filed: Mar. 21, 2016

(65) Prior Publication Data

US 2017/0267337 A1  Sep. 21, 2017

(51) Int. Cl.
  *B64C 25/46* (2006.01)
  *B60T 8/176* (2006.01)
  *B60T 8/17* (2006.01)
  *B60T 8/32* (2006.01)

(52) U.S. Cl.
  CPC ............ *B64C 25/46* (2013.01); *B60T 8/1703* (2013.01); *B60T 8/176* (2013.01); *B60T 8/325* (2013.01); *B60T 2240/00* (2013.01)

(58) Field of Classification Search
  CPC ........ B60T 8/1703; B60T 8/176; B60T 8/325; B60T 2240/00; B64C 25/46
  USPC ........ 701/70, 71, 75, 76, 78, 79, 80, 84, 83, 701/90; 303/150–160, 126; 188/181 A; 244/111
  See application file for complete search history.

(56) References Cited

U.S. PATENT DOCUMENTS

| 4,530,058 A | 7/1985 | Cook |
| 6,220,676 B1 * | 4/2001 | Rudd, III ............... B60T 8/1703 188/181 T |
| 6,711,488 B2 * | 3/2004 | Zierolf ................... B60T 8/1703 303/121 |

(Continued)

FOREIGN PATENT DOCUMENTS

| EP | 0036719 | 9/1981 |
| GB | 2108225 | 5/1983 |
| GB | 2469703 | 10/2010 |

(Continued)

OTHER PUBLICATIONS

EP Search report dated Sep. 5, 2017 in EP Application No. 17159232.2.

*Primary Examiner* — Nga X Nguyen
(74) *Attorney, Agent, or Firm* — Snell & Wilmer, L.L.P.

(57) ABSTRACT

The present disclosure provides a skid control system that includes a brake control device configured to convert a current command value to create a braking pressure, wherein the braking pressure is applied to a hydraulically actuated brake and/or an electrically actuated brake. A deceleration control unit receives a filtered wheel speed value and/or a filtered wheel acceleration value from the wheel assembly. A brake control algorithm unit retrieves a noise threshold value corresponding with the at least one of the filtered wheel speed value or the filtered wheel acceleration value. A pressure control unit receives a feedback pressure from the hydraulically actuated brake and/or an electrically actuated brake, wherein the pressure control unit either increases or decreases the current command value in response to a difference between the pressure command value and a feedback pressure being either less than or greater than the noise threshold value.

20 Claims, 6 Drawing Sheets

(56) References Cited

U.S. PATENT DOCUMENTS 8,833,869 B2 9/2014 Matsuzaki et al.
2003/0220731 A1 11/2003 Zierolf

FOREIGN PATENT DOCUMENTS

JP H05310108 A 11/1993
WO 9850262 11/1998

* cited by examiner

ADAPTIVE PRESSURE SKID CONTROL

FIELD OF THE DISCLOSURE

The present disclosure relates to aircraft skid control systems. In particular, the disclosure relates to systems and methods for antiskid protection in aircraft at landing speeds.

BACKGROUND OF THE DISCLOSURE

Aircraft brake systems typically employ a series of friction disks compressed together to stop the aircraft. Some aircraft brake systems adjust the compression of the friction disks by controlling a servo valve to adjust the pressure of a hydraulic actuator. Other aircraft brake systems adjust the compression of the friction disks by controlling electronic actuators. The aircraft brake systems may control the compression of the friction disks based on a feedback loop including the received braking request and feedback from the servo valve or actuators.

Many brake systems include an antiskid function, which provides maximum braking efficiency during pedal braking and prevents the wheels from locking. An electro-mechanical skid control system may be susceptible to the effects of electrical noise affecting communication links among aircraft braking system components. As such, aircraft braking system components may also be prone to false activation caused by electrical noise.

SUMMARY OF THE DISCLOSURE

In various embodiments, the present disclosure provides A skid control system comprising, a brake control device configured to convert a current command value to create at least one of a braking pressure or braking force to be applied to at least one of a hydraulically actuated brake or an electrically actuated brake, a deceleration control unit configured to receive at least one of a filtered wheel speed value or a filtered wheel acceleration value from a wheel assembly, a brake control algorithm unit configured to retrieve a noise threshold value corresponding with the at least one of the filtered wheel speed value or the filtered wheel acceleration value, and at least one of a force control unit or a pressure control unit configured to receive at least one of a pressure command value or a force command value from a brake control unit and at least one of a feedback pressure or a feedback force from the at least one of the hydraulically actuated brake or the electrically actuated brake, wherein at least one of the force control unit or the pressure control unit at least one of increases or decreases the current command value in response to a difference between the at least one of the pressure command value or the force command value and at least one of the feedback pressure or the feedback force being at least one of less than or greater than the noise threshold value.

In various embodiments, the noise threshold value is retrieved from at least one of a lookup-table, database, or flat-file. In various embodiments, the skid control system further comprises a brake control unit (BCU) configured to receive a pilot commanded pressure value and an antiskid pressure command value and send the pressure command value to the pressure control unit. In various embodiments, the pressure command value is derived from the pilot commanded pressure value and the antiskid pressure command value. In various embodiments, the pressure command value equals a minimum value of the antiskid pressure command value and the pilot commanded pressure value. In various embodiments, the current command value corresponds with the pressure command value to be applied to the at least one of the hydraulically actuated brake or the electrically actuated brake. In various embodiments, multiple noise threshold values are defined for a single aircraft. In various embodiments, the feedback pressure is measured by a pressure sensor.

In various embodiments, the present disclosure provides a method for adapting force in a skid control system comprising, converting, at a brake control device, a current command value to create at least one of a braking pressure or braking force, wherein the at least one of the braking pressure or the braking force is applied to at least one of a hydraulically actuated brake or an electrically actuated brake, receiving, at a deceleration control unit, at least one of a filtered wheel speed value or a filtered wheel acceleration value from a wheel assembly, retrieving, by a brake control algorithm unit, a noise threshold value corresponding with at least one of the filtered wheel speed value or the filtered wheel acceleration value, receiving, by at least one of a pressure control unit or a force control unit, at least one of a pressure command value and a force command value from a brake control unit and at least one of a feedback pressure or a feedback force from the at least one of the hydraulically actuated brake or the electrically actuated brake, wherein the at least one of the feedback pressure or the feedback force is received from a force sensor, and at least one of increasing or decreasing the current command value in response to a difference between at least one of the force command value or the pressure command value and at least one of the feedback pressure or the feedback force being at least one less than or greater than the noise threshold value.

In various embodiments, the noise threshold value is retrieved from at least one of a lookup-table, database, or flat-file. In various embodiments, the method further comprises receiving, at a brake control unit (BCU), a pilot commanded force value and a deceleration force command value, and sending a force command value to the force control unit. In various embodiments, the force command value is derived from at least one of the pilot commanded force value or the deceleration force command value. In various embodiments, the force command value equals a minimum value of at least one of the deceleration force command value or the pilot commanded force value. In various embodiments, the force control unit converts the force command value to the current command value to be applied to the at least one of the hydraulically actuated brake or the electrically actuated brake. In various embodiments, the noise threshold value is stored in at least one of a lookup-table, database, or flat-file.

In various embodiments, the present disclosure provides A brake control device comprising, a processor, and a tangible, non-transitory memory configured to communicate with the processor, the tangible, non-transitory memory having instructions stored thereon that, in response to execution by the processor, cause the processor to perform operations comprising, converting a current command value to create at least one of a braking pressure or a braking force, wherein the braking pressure or the braking force is applied to at least one of a hydraulically actuated brake or an electrically actuated brake, receiving at least one of a filtered wheel speed value or a filtered wheel acceleration value from a wheel assembly, retrieving a noise threshold value corresponding with the at least one of the filtered wheel speed value or the filtered wheel acceleration value, receiving at least one of a pressure command value or a force command value from a brake control unit and at least one of a feedback pressure or a feedback force from a pressure sensor, and at least one of increasing or decreasing the current command value in response to a difference between at least one of the pressure command value or the force command value and at least one of the feedback pressure or the feedback force being at least one less than or greater than the noise threshold value.

In various embodiments, the pressure command value is derived from at least one of a pilot commanded pressure value or an antiskid pressure command value. In various embodiments, the force command value is derived from at least one of a pilot commanded force value or a deceleration force command value. In various embodiments, the pressure command value equals a minimum value of the antiskid pressure command value and the pilot commanded pressure value. In various embodiments, the force command value equals a minimum value of at least one of the deceleration force command value and the pilot commanded force value.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, systems and methods may find particular use in connection with aircraft antiskid braking systems. However, various aspects of the disclosed embodiments may be adapted for optimized performance with a variety of applications implementing brake control systems and/or pressure and/or force controllers. As such, numerous applications of the present disclosure may be realized.

Figure 1:
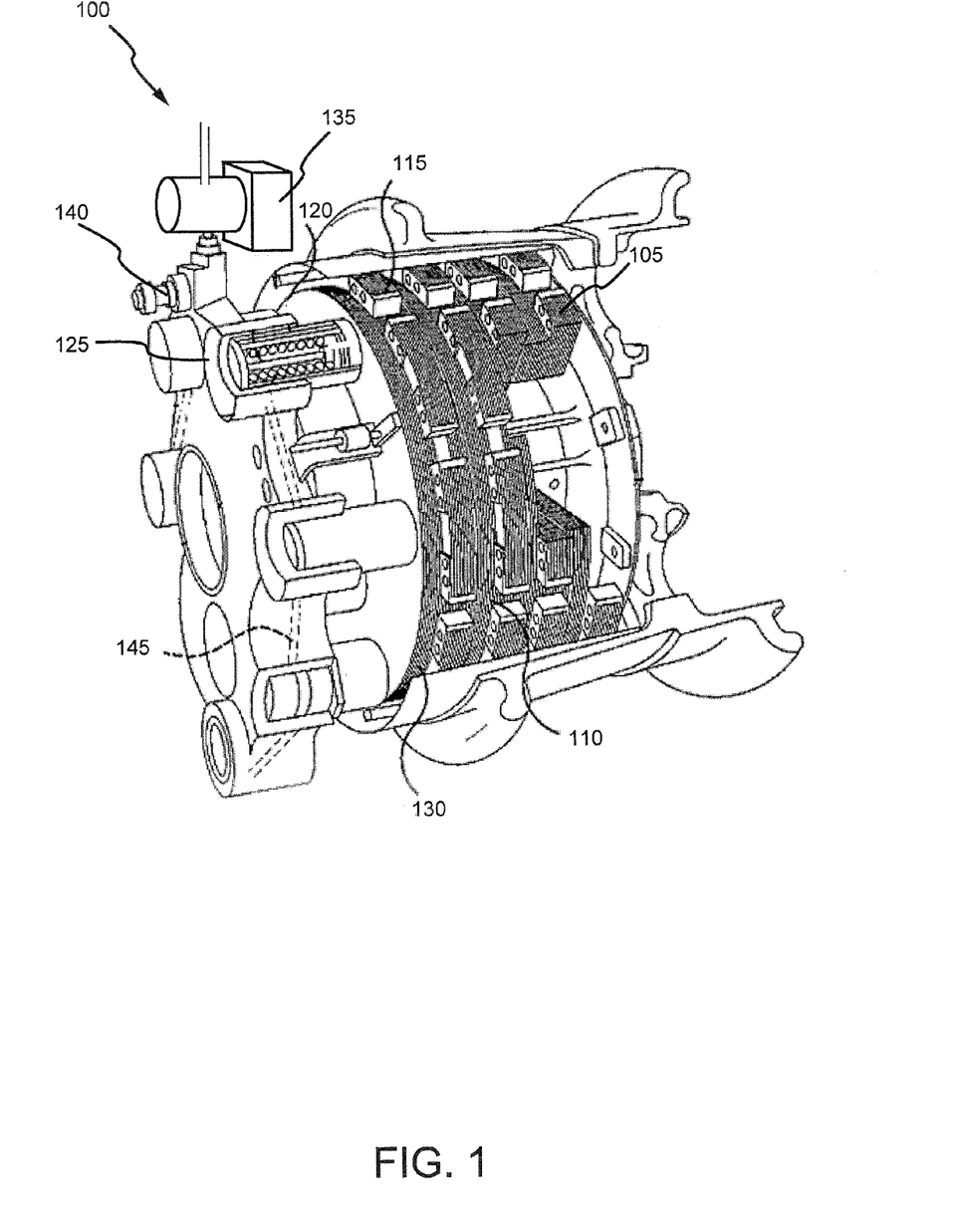
FIG. 1 illustrates a perspective view of a hydraulically actuated brake in accordance with various embodiments.

Referring to FIG. 1, a hydraulically actuated brake 100 includes a brake disk stack 105. The brake disk stack 105 comprises a number of disk shaped stators 110 and a number of disk shaped rotors 115. Pistons 120 are mounted on a piston housing 125. The pistons 120 function to apply pressure against a pressure plate 130 (i.e., first stator in the stack of rotors and stators) to compress the brake disk stack 105. Friction is generated in response to the disk shaped rotors 115 being pressed into contact with the disk shaped stators 110, which slows a wheel.

Each of the pistons 120 are biased into a retracted position relative to the pressure plate 130. A hydraulic fluid flow rate is controlled by a servo valve 135. When the servo valve 135 is open, hydraulic fluid flows into the piston housing 125 through a fitting 140 and into internal channels 145. When pressure is applied to the hydraulic fluid, the pistons 120 are driven against the pressure plate 130. When servo valve 135 decreases the flow of hydraulic fluid, then the pistons 120 are retracted.

Figure 2:
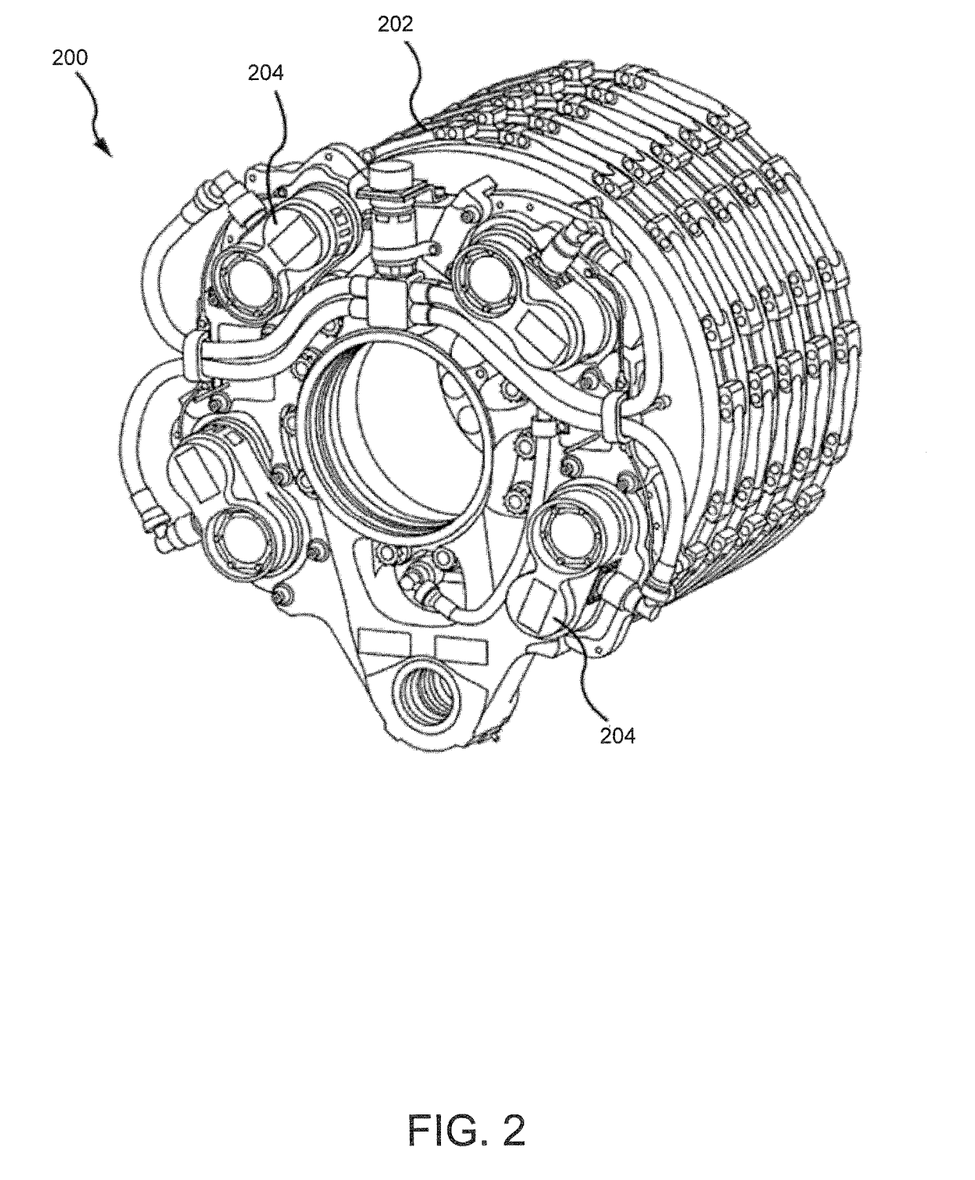
FIG. 2 illustrates a perspective view of an electrically actuated brake in accordance with various embodiments.

Referring to FIG. 2, an electrically actuated brake 200 may comprise a brake disk stack 202 having a cylindrical geometry. An electromechanical actuator (EMA) 204 is disposed at an end of the electrically actuated brake 200. EMA 204 is configured to apply compressive force to the brake disk stack 202 to slow or stop an aircraft, for example.

In various embodiments, the electrically actuated brake 200 includes a number of alternating rotor and stator disks mounted with respect to an attached wheel for relative axial movement. A rotor disk may be coupled to the wheel for rotation therewith and each stator disk may be coupled to a non-rotatable wheel support. A back plate may be located at a first end of the brake disk stack 202 and a brake head may be located at a second end. The brake head may house a plurality of EMA 204 that further comprise reciprocating rams that extend to exert force on the brake disk stack 202, pressing it against the back plate. The EMA 204 may be mounted to a surface of the brake head that is parallel to a friction surface of the actuated brake.

In various embodiments, the EMA 204 may be coupled to or otherwise operate a force generating device such as, for example, a ball screw, a ram, and/or the like. In operation, the EMA 204 may cause the force generating device to move and/or exert a force on other brake system structure such as, for example, a brake disk or pad to exert a stopping force (i.e., braking torque) on a wheel or other suitable moving structure. This stopping force may load and/or exert a corresponding force on the EMA 204 structures such as, for example, an EMA housing.

Figure 3:
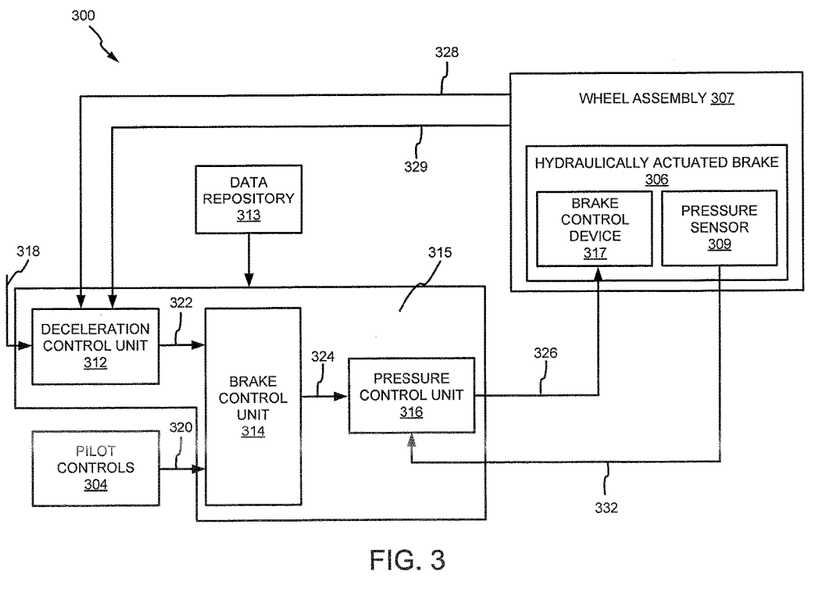
FIG. 3 is a block diagram showing a skid control system for a hydraulically actuated brake in accordance with various embodiments.

FIG. 3 is a block diagram showing various system components and data flow for skid control system 300 for a hydraulically actuated brake. Occasional reference may also be made to components as shown in FIG. 1. Those of ordinary skill in the art will appreciate that these components and others, are presented herein for explanation. Variations may be made among the components, configurations, and linkages without departing from the scope of this disclosure.

The brake control device 317 may receive an instruction to increase pressure within the hydraulically actuated brake 306. In response, the brake control device 317 may increase the opening of a servo valve 135 to allow more pressurized fluid to drive the piston, causing compression of the brake disk stack 105. This compression causes deceleration of the wheel assembly 307. Pressure exerted against the brake disk stack 105 may be referred to as a braking pressure.

Brake Control Unit (BCU) 314 may include one or more processors and one or more tangible, non-transitory memories and be capable of storing instructions. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, the hydraulically actuated brake 306 may be controlled by pilot controls 304. For example, the BCU 314 may receive a pilot commanded pressure value 320 that corresponds to a commanded amount of braking. The pilot commanded pressure value 320 can be generated or altered in response to a depression of a brake pedal within a cockpit of the aircraft. The pilot commanded pressure value 320 can also be generated or altered in response to an instruction to retract landing gear of the aircraft.

Similarly, the hydraulically actuated brake 306 may be controlled by a deceleration control unit 312 that is part of a brake control algorithm unit 315. The brake control algorithm unit 315 controls the braking of the aircraft based on an algorithm. In various embodiments, the brake control algorithm unit 315 may include the deceleration control unit 312, a BCU 314 and a pressure control unit 316. In various embodiments, the pressure control unit 316 further includes a processor, Random Access Memory (RAM), and storage memory for executing computer instructions relative to the various disclosed features of the pressure control unit 316.

In various embodiments, the deceleration control unit 312 receives a fixed deceleration command value 318, a filtered wheel speed value 328 and a filtered wheel acceleration value 329. The deceleration control unit 312 can output an antiskid pressure command value 322 corresponding to a commanded amount of pressure to be applied to the hydraulically actuated brake 306 based on the fixed deceleration command value 318, the filtered wheel speed value 328 and the filtered wheel acceleration value 329. The antiskid pressure command value may be based on an algorithm for reducing the likelihood of the aircraft skidding and/or based on an automatic deceleration algorithm.

The BCU 314 receives both the pilot commanded pressure value 320 and the antiskid pressure command value 322 and sends a pressure command value 324 to the pressure control unit 316. The pressure command value 324 is derived from either the pilot commanded pressure value 320 or the antiskid pressure command value 322. In various embodiments, the pressure command value 324 may be equal to the minimum value of the antiskid pressure command value 322 and the pilot commanded pressure value 320. The pressure command value 324 corresponds to a commanded amount of pressure to be applied to the hydraulically actuated brake 306.

Having received the pressure command value 324, the pressure control unit 316 converts the pressure command value 324 to a current command value 326. The current command value 326 is sent to the brake control device 317 of the hydraulically actuated brake 306. The brake control device 317 converts the current command value 326 to a pressure value, which is applied to one or more disks of the hydraulically actuated brake 306. The relationship between received current of the brake control device 317 and the amount of pressure applied may generally be described as a linear relationship between current and pressure.

In various embodiments, the pressure control unit 316 may use the above relationship to determine a current command value 326 based on the pressure command value 324. The pressure control unit 316 may also determine the current command value 326 based on a feedback pressure 332 corresponding to a detected pressure applied to the one or more disks of the hydraulically actuated brake 306.

In various embodiments, the feedback pressure 332 is measured by a pressure sensor 309. Accordingly, determination of the current command value 326 is based on a feedback pressure 332, such that the current command value 326 is adjusted to bring the feedback pressure 332 and the pressure command value 324 into equilibrium.

In response to a difference between feedback pressure 332 and the pressure command value 324, the pressure control unit 316 may increase or decrease the current command value 326. The current command value 326 may be adjusted in a loop-type process, until the feedback pressure 332 matches the pressure command value 324, within a noise threshold value.

A number of factors may introduce frequency noise into the signals that pass through the BCU 314, thereby causing erroneous values to be communicated at various points in BCU 314. For example, the speed of an aircraft while landing or taxiing is a known source of frequency noise due, at least in part, to aircraft vibrations.

To offset anticipated frequency noise, adjustments to the current command value 326 may be invoked in response to a difference between the pressure command value 324 and the feedback pressure 332 falling outside a noise threshold value. Multiple noise threshold values may be defined based on frequency noise volumes that an aircraft would be expected to encounter while traveling at different speeds. In that regard, a noise threshold value may be associated with a given aircraft speed.

In various embodiments, multiple noise threshold values may be defined for a single aircraft to cover a wide range of speed variables. Because different aircraft react differently at different speeds, the noise threshold values may be at least partially based on a volume of frequency noise that is created by particular aircraft, traveling within a wide spectrum of speeds.

The brake control algorithm unit 315 retrieves a noise threshold value that corresponds with a filtered wheel speed value 328, a filtered wheel acceleration value 329, or both values. The brake control algorithm unit 315 identifies a noise threshold value that is stored in a data repository 313 (e.g., lookup-table, database, flat file, etc.). In response to a noise threshold being identified, the brake control algorithm unit 315 determines whether a difference between the pressure command value 324 and the feedback pressure 332 falls outside of the noise threshold value. If this pressure difference is outside the noise threshold, the current command value 326 is at least one of increased or decreased.

Figure 4:
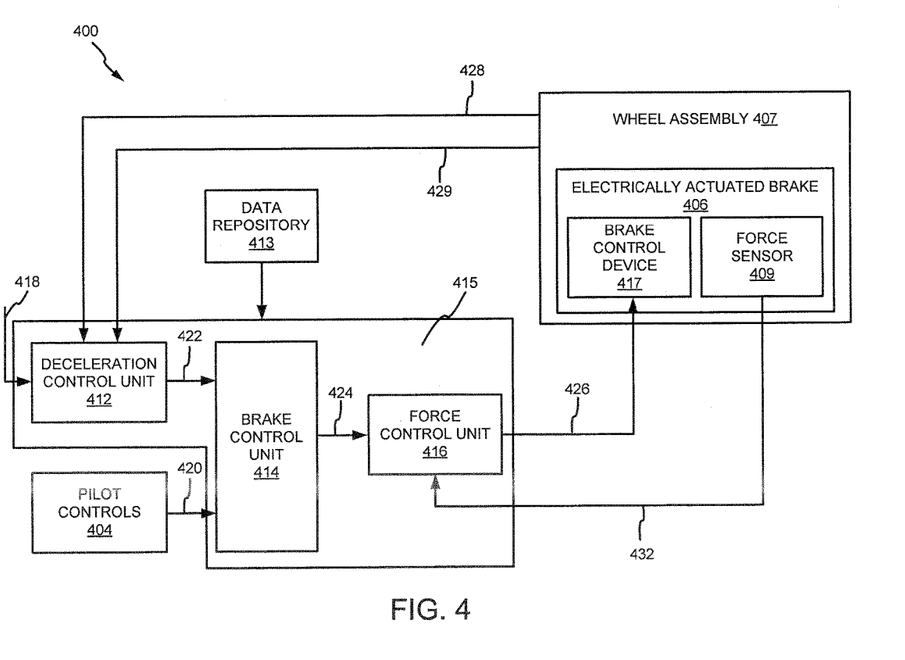
FIG. 4 is a block diagram showing a skid control for an electrically actuated brake in accordance with various embodiments.

FIG. 4 is a block diagram showing various system components and data flow for a skid control system 400 for an electrically actuated braking system. Several components as shown in FIG. 2 will be referenced in this description of skid control system 400.

The source of motive force is the primary differentiator between hydraulically and electrically actuated skid control systems. In the case of a hydraulically actuated skid control system 300, the actuation driver is pressure from a fluid, while an electrically actuated skid control system 400 relies on electrically driven actuation.

In various embodiments, a brake control device 417 includes an EMA 204 to drive a piston and cause compression to an electrically actuated brake 406. The compression of the brake disk stack 202 causes deceleration of the wheel assembly 407. The electrically actuated brake 406 may be controlled by the pilot controls 404. For example, a Brake Control Unit (BCU) 414 may receive a pilot commanded force value 420 in response to a depression of a brake pedal within a cockpit of the aircraft.

The electrically actuated brake 406 may be controlled by a deceleration control unit 412 that is part of a brake control algorithm unit 415, which controls the braking of the aircraft based on an algorithm. In various embodiments, the brake control algorithm unit 415 includes the deceleration control unit 412, BCU 414, and force control unit 416. In various embodiments, the force control unit 416 further includes a processor, Random Access Memory (RAM), and storage memory for executing computer instructions relative to the various disclosed features of the force control unit 416.

In various embodiments, the deceleration control unit 412 receives a fixed deceleration command value 418, a filtered wheel speed value 428 and a filtered wheel acceleration value 429. The deceleration control unit 412 outputs a deceleration force command value 422 corresponding to an amount of force to be applied to the brake disk stack 202 of the electrically actuated brake 406 based on the fixed deceleration command value 418, the filtered wheel speed value 428 and the filtered wheel acceleration value 429.

The BCU 414 receives both the pilot commanded force value 420 and the deceleration force command value 422 and sends a force command value 424 to the force control unit 416. The force command value 424 is derived from either the pilot commanded force value 420 or the deceleration force command value 422. In various embodiments, the force command value 424 may be equal to the minimum value of the deceleration force command value 422 and the pilot commanded force value 420. The force command value 424 corresponds to an amount of force to be applied to the brake disk stack 202.

A force control unit 416 converts the force command value 424 to a current command value 426. The current command value 426 is sent to the brake control device 417 of the electrically actuated brake 406. The brake control device 417 converts the current command value 426 to a force value that drives the EMA 204 to compress the brake disk stack 202. The relationship between received current of the brake control device 417 and the amount of force applied may generally be described as a linear relationship between current and force.

In various embodiments, the force control unit 416 uses the above relationship to determine a current command value 426 based on the force command value 424. The force control unit 416 may also determine the current command value 426 based on a feedback force 432 corresponding to a detected force applied to the one or more disks of the brake disk stack 202.

In various embodiments, the feedback force 432 is measured by a force sensor 409. Accordingly, determination of the current command value 426 is based on a feedback force 432, such that the current command value 426 is adjusted to bring the feedback force 432 and the force command value 424 into equilibrium.

In response to a difference between feedback force 432 and the force command value 424, the force control unit 416 may increase or decrease the current command value 426. The current command value 426 may be adjusted in a loop-type process, until the feedback force 432 matches the force command value 424, within a noise threshold value.

The brake control algorithm unit 415 retrieves a noise threshold value that corresponds with a filtered wheel speed value 428, a filtered wheel acceleration value 429, or both values. The brake control algorithm unit 415 identifies a noise threshold value that is stored in a data repository 413 (e.g., lookup-table, database, flat file, etc.). In response to a noise threshold being identified, the brake control algorithm unit 415 determines whether a difference between the force command value 424 and the feedback force 432 falls outside of the noise threshold value. If this force difference is outside the noise threshold, the current command value 426 is at least one of increased or decreased.

Figure 5:
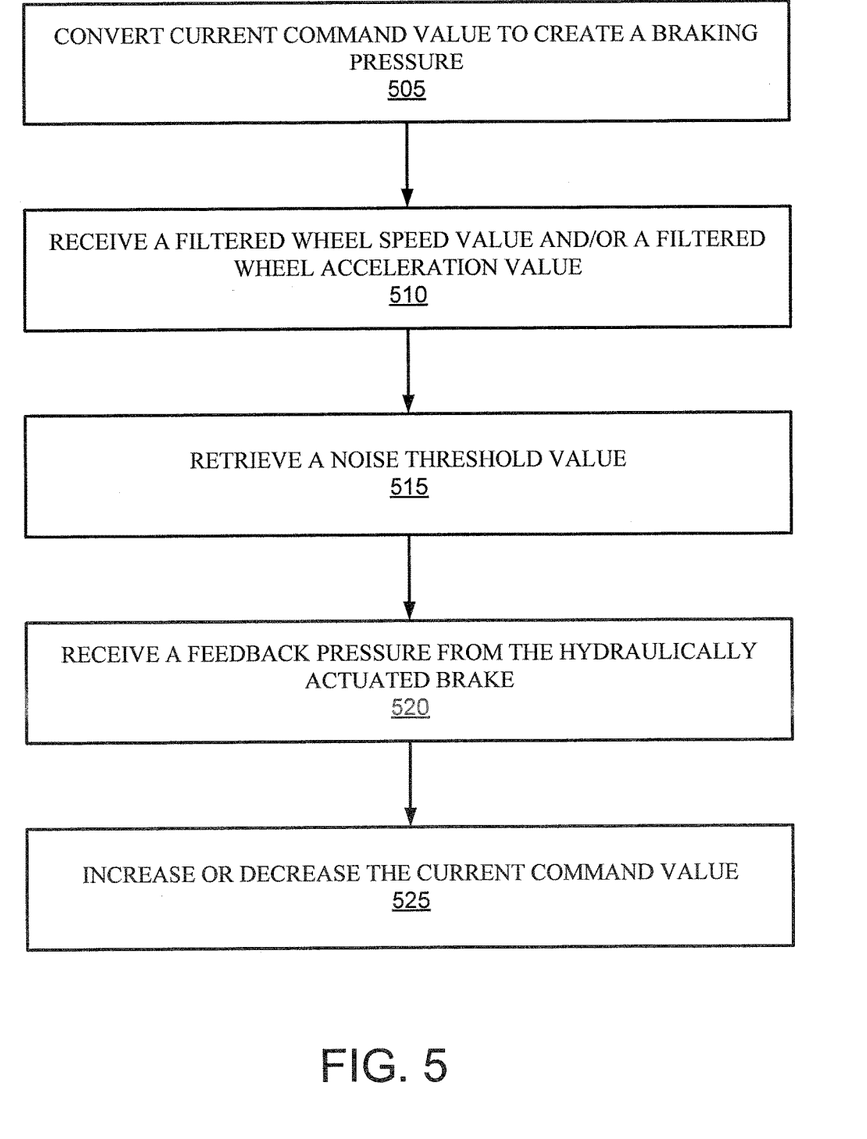
FIG. 5 is a diagram illustrating a process flow for adapting a pressure value in a skid control system in accordance with various embodiments.

FIG. 5 illustrates a process for adapting force in a hydraulically actuated skid control system. A brake control device 317 converts a current command value 326 to create a braking pressure (step 505), wherein the braking pressure is applied to a hydraulically actuated brake 306 of a wheel assembly 307.

In various embodiments, a deceleration control unit 312 receives a filtered wheel speed value 328 and/or a filtered wheel acceleration value 329 (step 510) from the wheel assembly 307. A brake control algorithm unit 315 retrieves a noise threshold value (step 515) corresponding with the at least one of the filtered wheel speed value 328 or the filtered wheel acceleration value 329. A pressure control unit 316 receives a feedback pressure 332 from the hydraulically actuated brake 306 (step 520).

The pressure control unit 316 either increases or decreases the current command value 326 (step 525) when a difference between the pressure command value 324 and a feedback pressure 332 is less than or greater than the noise threshold value.

Figure 6:
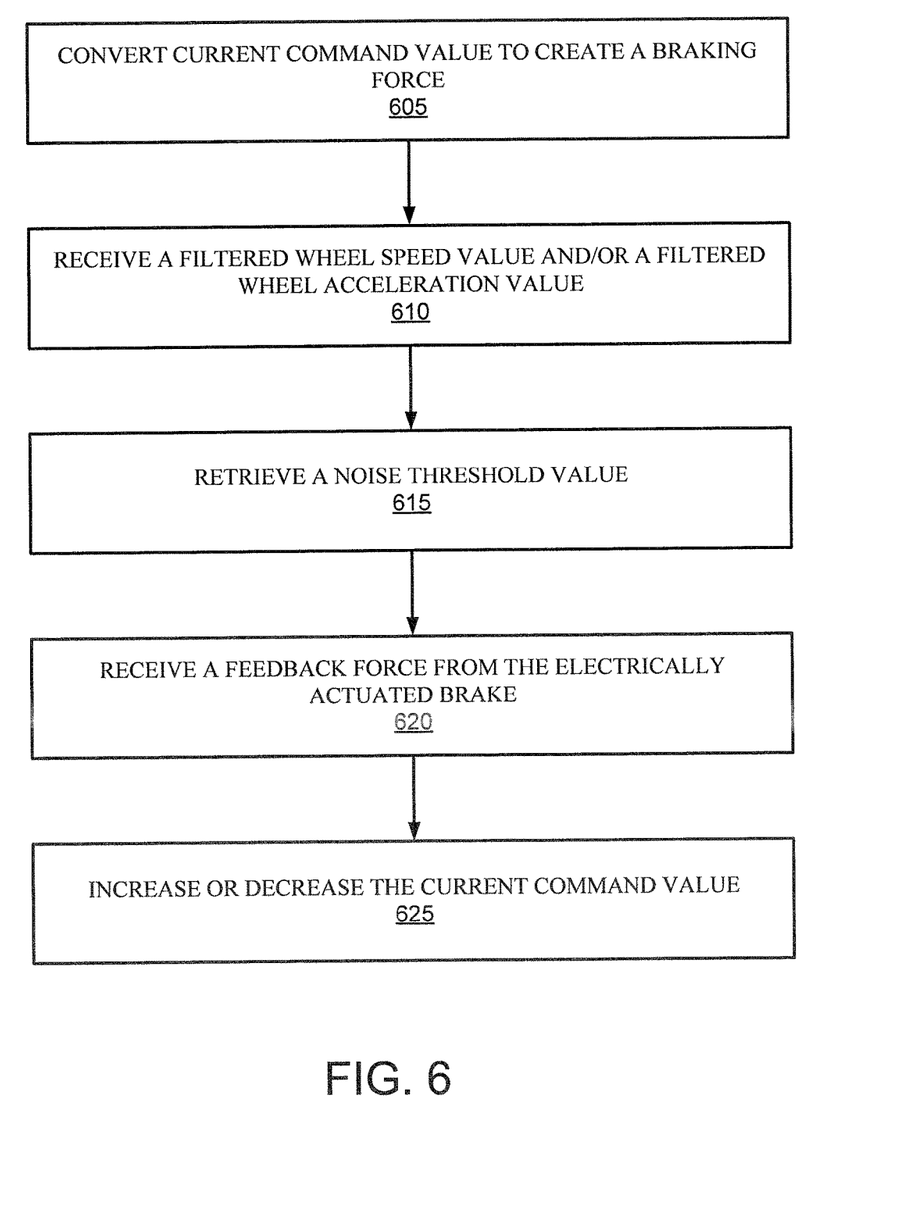
FIG. 6 is a diagram illustrating a process flow for adapting a force value in a skid control system in accordance with various embodiments.

FIG. 6 illustrates a process flow for adapting force in an adaptive force skid control system in accordance with various embodiments. A brake control device 417 converts a current command value 426 to create a braking force (step 605), wherein the braking force is applied to an electrically actuated brake 406 of a wheel assembly 407.

A deceleration control unit 412 receives a filtered wheel speed value 428 and/or a filtered wheel acceleration value 429 (step 610) from the wheel assembly 407. A brake control algorithm unit 415 retrieves a noise threshold value (step 615) corresponding with the at least one of the filtered wheel speed value 428 or the filtered wheel acceleration value 429. A force control unit 416 receives a feedback force 432 from the electrically actuated brake 406 (step 620).

The force control unit 416 either increases or decreases the current command value 426 (step 625) when a difference between the force command value 424 and a feedback force 432 is less than or greater than the noise threshold value.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A skid control system comprising:
    a brake control device that converts a current command value to create at least one of a braking pressure or braking force to be applied to at least one of a hydraulically actuated brake or an electrically actuated brake;
    a deceleration control unit that receives at least one of a filtered wheel speed value or a filtered wheel acceleration value from a wheel assembly;
    a brake control algorithm unit that retrieves a noise threshold value corresponding with the at least one of the filtered wheel speed value or the filtered wheel acceleration value; and
    at least one of a force control unit or a pressure control unit that receives at least one of a pressure command value or a force command value from a brake control unit and at least one of a feedback pressure or a feedback force from the at least one of the hydraulically actuated brake or the electrically actuated brake, wherein at least one of the force control unit or the pressure control unit at least one of increases or decreases the current command value in response to a difference between the at least one of the pressure command value or the force command value and at least one of the feedback pressure or the feedback force being at least one of less than or greater than the noise threshold value, wherein the current command value is adjusted in a loop-type process until the feedback pressure matches the pressure command value within the noise threshold value.

2. The skid control system of claim 1, wherein the noise threshold value is retrieved from at least one of a lookup-table, database, or flat-file.

3. The skid control system of claim 1, wherein the brake control unit is receives at least one of a pilot commanded pressure value or a pilot commanded force value and at least one of an antiskid pressure command value or a deceleration force command value and send at least one of the pressure command value or the force command value to the at least one of the force control unit or the pressure control unit.

4. The skid control system of claim 3, wherein the at least one of the pressure command value or the force command value is derived from at least one of the pilot commanded pressure value or the pilot commanded force value and at least one of the antiskid pressure command value or the deceleration force command value.

5. The skid control system of claim 3, wherein at least one of the pressure command value or the force command value equals a minimum value of the at least one of the antiskid pressure command value or the deceleration force command value and at least one of the pilot commanded pressure value or the pilot commanded force value.

6. The skid control system of claim 3, wherein the current command value corresponds to at least one of the pressure command value to be applied to the hydraulically actuated brake or the force command value to be applied to the electrically actuated brake.

7. The skid control system of claim 1, wherein multiple noise threshold values are defined for a single aircraft.

8. The skid control system of claim 1, wherein the feedback pressure is measured by a pressure sensor and the feedback force is measured by a force sensor.

9. A method for adapting force in a skid control system comprising:
    converting, by a brake control device, a current command value to create at least one of a braking pressure or braking force, wherein the at least one of the braking pressure or the braking force is applied to at least one of a hydraulically actuated brake or an electrically actuated brake;
    receiving, by a deceleration control unit, at least one of a filtered wheel speed value or a filtered wheel acceleration value from a wheel assembly;
    retrieving, by a brake control algorithm unit, a noise threshold value corresponding with at least one of the filtered wheel speed value or the filtered wheel acceleration value;
    receiving, by at least one of a pressure control unit or a force control unit, at least one of a pressure command value and a force command value from a brake control unit and at least one of a feedback pressure or a feedback force from the at least one of the hydraulically actuated brake or the electrically actuated brake, wherein the at least one of the feedback pressure or the feedback force is received from a force sensor; and
    at least one of increasing or decreasing the current command value in response to a difference between at least one of the force command value or the pressure command value and at least one of the feedback pressure or the feedback force being at least one less than or greater than the noise threshold value, wherein the current command value is adjusted in a loop-type process until the feedback pressure matches the pressure command value within the noise threshold value.

10. The method of claim 9, wherein the noise threshold value is retrieved from at least one of a lookup-table, database, or flat-file.

11. The method of claim 9, further comprising receiving, at a brake control unit (BCU), a pilot commanded force value and a deceleration force command value and send at least one of the force command value or the pressure command value to the at least one of the pressure control unit or the force control unit.

12. The method of claim 11, wherein the force command value is derived from at least one of the pilot commanded force value or the deceleration force command value.

13. The method of claim 11, wherein the force command value equals a minimum value of at least one of the deceleration force command value or the pilot commanded force value.

14. The method of claim 11, wherein the force control unit converts the at least one of the force command value or the pressure command value to the current command value to be applied to the at least one of the hydraulically actuated brake or the electrically actuated brake.

15. The method of claim 9, wherein the noise threshold value is stored in at least one of a lookup-table, database, or flat-file.

16. A brake control device comprising:
a processor; and
a tangible, non-transitory memory configured to communicate with the processor, the tangible, non-transitory memory having instructions stored thereon that, in response to execution by the processor, cause the processor to perform operations comprising:
converting a current command value to create at least one of a braking pressure or a braking force, wherein the braking pressure or the braking force is applied to at least one of a hydraulically actuated brake or an electrically actuated brake;
receiving at least one of a filtered wheel speed value or a filtered wheel acceleration value from a wheel assembly;
retrieving a noise threshold value corresponding with the at least one of the filtered wheel speed value or the filtered wheel acceleration value;
receiving at least one of a pressure command value or a force command value from a brake control unit and at least one of a feedback pressure or a feedback force from a pressure sensor; and
at least one of increasing or decreasing the current command value in response to a difference between at least one of the pressure command value or the force command value and at least one of the feedback pressure or the feedback force being at least one less than or greater than the noise threshold value, wherein the current command value is adjusted in a loop-type process until the feedback pressure matches the pressure command value within the noise threshold value.

17. The brake control device of claim 16, wherein the pressure command value is derived from at least one of a pilot commanded pressure value or an antiskid pressure command value.

18. The brake control device of claim 16, wherein the force command value is derived from at least one of a pilot commanded force value or a deceleration force command value.

19. The brake control device of claim 17, wherein the pressure command value equals a minimum value of the antiskid pressure command value and the pilot commanded pressure value.

20. The brake control device of claim 18, wherein the force command value equals a minimum value of at least one of the deceleration force command value and the pilot commanded force value.

* * * * *

UNITED STATES PATENT AND TRADEMARK OFFICE
CERTIFICATE OF CORRECTION

PATENT NO.        : 9,919,795 B2
APPLICATION NO.   : 15/075601
DATED             : March 20, 2018
INVENTOR(S)       : Marc Georgin

Page 1 of 1

It is certified that error appears in the above-identified patent and that said Letters Patent is hereby corrected as shown below:

In the Claims

Column 10, Line 2 Claim 3 please delete "is"

Signed and Sealed this
Thirty-first Day of July, 2018

Andrei Iancu
*Director of the United States Patent and Trademark Office*